United States Patent [19]

Herding

[11] Patent Number: 4,979,969
[45] Date of Patent: Dec. 25, 1990

[54] FILTER FOR THE SEPARATING OF SOLIDS PARTICLES FROM HOT, GASEOUS OR LIQUID MEDIA

[75] Inventor: Walter Herding, Amberg, Fed. Rep. of Germany

[73] Assignee: Herding GmbH, Amberg, Fed. Rep. of Germany

[21] Appl. No.: 361,265

[22] Filed: Jun. 5, 1989

[30] Foreign Application Priority Data

Jun. 4, 1988 [DE] Fed. Rep. of Germany ....... 3819056
May 16, 1989 [JP] Japan ..................................... 3915845

[51] Int. Cl.$^5$ ............................................. B01D 46/00
[52] U.S. Cl. ......................................... 55/523; 55/524; 55/521; 55/498; 55/341.1; 55/529; 55/378; 264/63
[58] Field of Search ................. 55/378, 522, 523, 524, 55/529, 525, 498, 521; 264/63

[56] References Cited

U.S. PATENT DOCUMENTS 4,728,503  3/1988  Iida et al. .............................. 55/524

FOREIGN PATENT DOCUMENTS 3017851  5/1981  Fed. Rep. of Germany .
3024324  1/1982  Fed. Rep. of Germany ........ 55/523
3515365  7/1986  Fed. Rep. of Germany .
3544404  6/1987  Fed. Rep. of Germany ........ 55/302
63-84614  4/1988  Japan ..................................... 55/523
817607   8/1989  United Kingdom ................... 55/523

Primary Examiner—Bernard Nozick
Attorney, Agent, or Firm—Scully, Scott, Murphy & Presser

[57] ABSTRACT

A filter for the separating of solids particles from hot, gaseous or liquid media, especially separating dust particles from hot flue gases in the temperature range of within 250° C. to 800° C., which consists of a permeable, inherently stable carrier material or substrate which is provided with larger pores; in essence, a support member in which the carrier material is constructed so as to be heat-resistant, and which especially contains constituents of non-corroding materials, such as glass, ceramic, metals or compounds thereof; and in which filter the carrier material can be produced through the intimate, partial bonding of the heat-resistant particles thereof, and wherein the carrier material also possesses a strucutre or, essentially, a spatial or three-dimensional configuration, which is correlated with the type of utilization and the specified capacity. The carrier material is covered at least on the outer surface along its mantle surface with a filler material allowing for finer pores, which is fine-grained and also heat-resistant, wherein the filler material is, in particular, applied as a thinner film-like coating on the carrier material, and in which this film material is constituted from particles of a dispersed mixture, of which one part is volatilized out of the mixture during a baking process, and in contrast therewith another part is introducible into the larger pores of the carrier material.

19 Claims, 2 Drawing Sheets

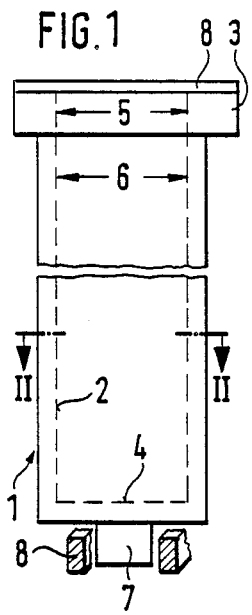
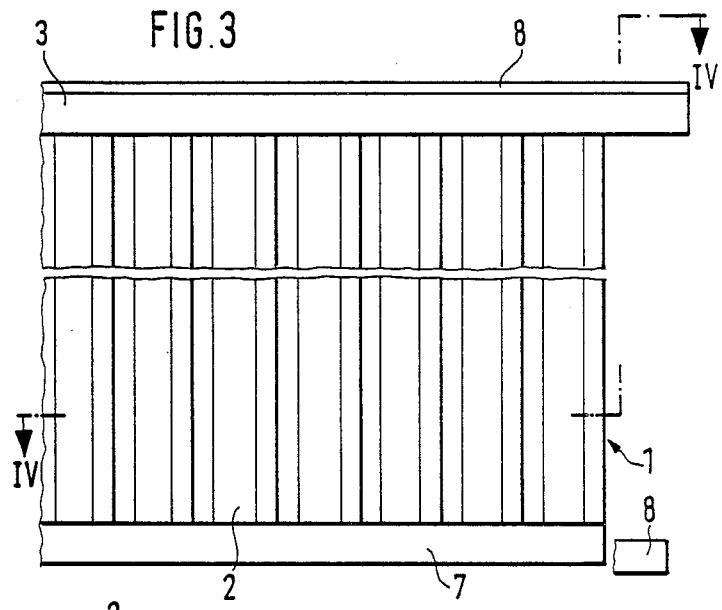
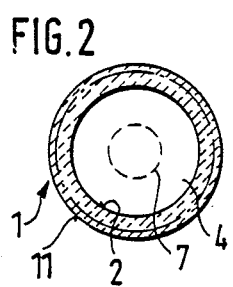
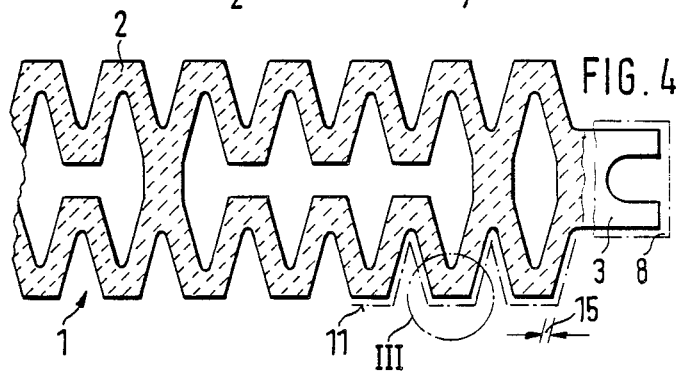
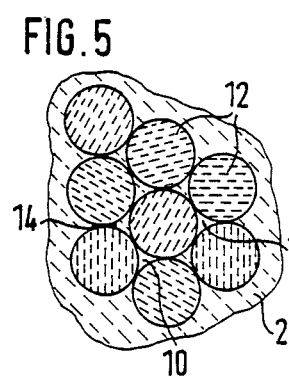
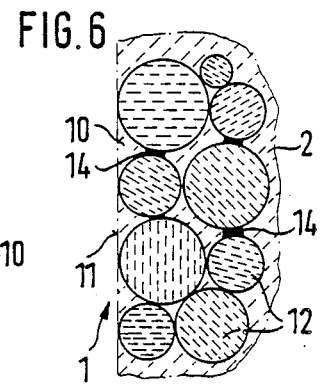
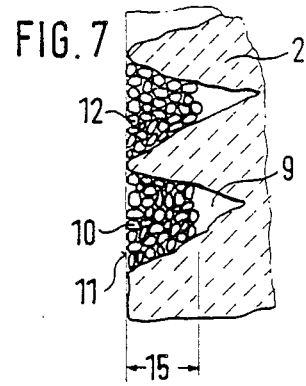

4,979,969

FILTER FOR THE SEPARATING OF SOLIDS PARTICLES FROM HOT, GASEOUS OR LIQUID MEDIA

BACKGROUND OF THE INVENTION

1. Field of the Invention

The present invention relates to a filter for the separating of solids particles from hot, gaseous or liquid media, especially separating dust particles from hot flue gases in the temperature range of within 120° to 800° C., which consists of a permeable, inherently stable carrier material or substrate which is provided with larger pores; in essence, a support member in which the carrier material is constructed so as to be heat-resistant, and which especially contains constituents of non-corroding materials, such as glass, ceramic, metals or compounds thereof; and in which filter the carrier material can be produced through the intimate, partial bonding of the heat-resistant particles thereof, and wherein the carrier material also possesses a structure or, essentially, a spatial or three-dimensional configuration, which is correlated with the type of utilization and the specified capacity.

It is in general known that for the separation of particles from gaseous or liquid media there are employed filters, and these, in accordance with their field of application, are to be constructed as textile fibers, carbon fiber filters, felt filters, paper filters, plastic filters, and metal or ceramic filters. While the textile, felt, paper and plastic filters are employed within a lower temperature range of up to about 150° C., the metal and ceramic filters can encompass the higher temperature range; for example, such as up to about 800° C., whereby the last-mentioned filters are also adapted to be employed in flue gas areas of heating installations. This is particularly desired inasmuch as, with an increasing reduction in environmentally-contaminating emissions, the filtering of hot gases at temperatures of more than 250° C. constantly increases in the significance thereof, inasmuch as, on the one hand, the high thermal content of the cleaned or purified gases can be readily employed to without having to take any further measures and, on the other hand, these flue gases produce a lower contamination of the environment.

The utilization of the available materials for the filters has shown in regard thereto that glass, ceramic and carbon fibers are susceptible to fracturing as a consequence of being brittle in nature, whereas for metal wires, such as metal webbing or meshes, the interspace between the wires is too large in order to be able to achieve an adequate filtering effect for fine dusts. In addition thereto, in that the utilization of such heat-resistant materials, such as sintered materials, porous, small-pore-sized ceramic materials amongst others, provides relatively little advantage, since the initially good separating action continuously deteriorates, inasmuch as fine dust penetrates into the pores of these materials and which can no longer be loosened therefrom even through special cleaning measures, and thereby finally leads to the blockage of the filter.

With regard to filters intended for use in the so-called high-temperature range, those have been established whose filter elements are primarily constituted from clay or ceramic and which, for purposes of simplicity, are constructed as cylindrical tubes in the shape of filter cartridges. These filter cartridges, which are constructed so as to be open at their ends, are installed between mounting supports in the housing for the filter and fastened therein in such a manner that the medium which is to be filtered will penetrate through the mantle or casing surface of the filter cartridge into the interior thereof and then again exit this interior through an opening at one end of the filter cartridge. This opening of the filter cartridge communicates with a chamber for the filtered medium, and then this medium exits through a discharge connector of the filter. The filter cartridges which are fastened to the mountings are rigidly joined to the latter, and cannot follow or compensate for the loads or stresses caused by the flow of the medium and especially the stresses produced during the cleaning of these cartridges through countercurrent flow, as a result of which it is not possible to be able to prevent fractures, especially at the neck portions of the filter cartridges; referring to German Patent No. 30 17 851.

In order to especially be able to prevent such damages being encountered by the filter cartridges, filter cartridges of this type are swingingly fastened on their mountings. This pendulating fastening of the applicable filter cartridge is facilitated in a manner in that, on the one hand, the mountings which separate the cleaning chamber or space from the filter chamber or space is constructed as an apertured plate, whereby the apertures are so configured that they possess a larger opening cross-section facing towards the cleaning chamber than towards the filter chamber. The filter cartridge, in turn, is equipped with a flange-shaped web at its end towards the cleaning chamber, through which this filter cartridge supports itself on the inwardly drawn bead of the aperture in the mounting. For purposes of a better support of the filter cartridge on this bead, this bead can also be configured as a cup-shaped annular shoulder, and the further cross-section of this aperture beginning from this annular shoulder, increasing towards the filter chamber, is wideningly constructed so as to impart the filter element the necessary space for the swinging moment. The end of the filter element; in essence, the filter cartridge, which is distant from this neck is provided with a bore into which there engages a bolt which is fastened to the mounting. This bolt can be inserted into the bore either with play or without play, whereby with the construction of the bolt in the absence of any play, the latter is supported by means of an elastic sleeve against the filter cartridge. The cup-shaped annular shoulder at the neck of the filter element and the elastic support of the bolt at the opposite end, on the one hand, facilitate the support for the bolt at the opposite end, and on the other hand, the swinging suspension of the filter cartridge on the mountings, so that this cartridge is better protected against damage in comparison with fixedly mounted filter cartridges. However, with regard to this filter it is viewed as being disadvantageous that the applicable filter cartridge is too unsteadily clamped between the mounting which, on the one hand, can lead to sealing problems and thereby to contaminations of the filtered medium, and on the other hand, due to the suspension of the filter cartridges from the cup-shaped annular shoulders, the disassembling of the filter cartridges is rendered more difficult; referring to German Patent No. 35 15 365.

SUMMARY OF THE INVENTION

Accordingly, it is an object of the present invention to improve in such a manner upon a filter pursuant to the above-mentioned type, whereby this filter becomes adapted for the filtering of hot media, such as flue gases and the like, in that notwithstanding being subjected to more intense temperatures; for example, 600° C. and possibly higher, the filter will retain its inherent stability and filtering effect, and will not be inclined to tearing, nor to the peeling or splitting off of material constituents, and in addition thereto, this filter is fastened absolutely tightly to the mountings without, as well as being able to be installed thereon and disassembled therefrom without any considerably effort, and moreover thereto will remain attached to these mountings in such a manner, that even mechanical loads imparted thereto, especially during the cleaning thereof, will not lead to any damaging thereof.

Pursuant to the invention, this object is attained in that the structure of the substrate or carrier material which is provided with larger pores is covered at least on the outer surface along its mantle surface with a filler material allowing for finer pores, which is fine-grained and also heat-resistant, wherein this filler material is, in particular, applied as a thinner film-like coating on the carrier material, and in which this film material is constituted from particles of a dispersed mixture, of which one part is volatilized out of the mixture during a baking process, and in contrast therewith another part is introducible into the larger pores of the carrier material. This mixture is fixed by means of an adhesive agent and a suspension fluid and in this aggregate condition is applicable to the carrier material, whereby it is partly bondable with itself and partly with the carrier material; and wherein these fine-grained constituents of the filler material, as well as the adhesive agent, are constituted from an applicable material which possess linear coefficients of thermal expansion somewhat equal to that of the carrier material, and wherein the raw material for the filler material is so dimensioned in its grain size that the pore size of the filler material still lies below 10 $\mu$m, and this filler material is introduced into the larger pores in the region of the mantle or casing surface of the carrier material and there will at least partly fill out especially the larger pores of the carrier material.

As a result of these measures there is not only advantageously achieved the objects on which the invention is predicated, but there is additionally attained the advantage that the different structures of the filter; in essence, carrier material and filler material thereof, have the same or at least about the same relationship of thermal expansion, and that notwithstanding special requirements of adhesion these tend neither to any damaging of their structures, nor to any widening of the pores; in particular, those of the filler material. This particular conception of the filter affords for an excellent filtering effect, even under intensely fluctuating temperatures of the media which are to be filtered, so that this filter is best suited for hot gases in the temperature range from about 250° C. up to about 600° to 800° C. Hereby, in that all of the materials and, consequently, also all structures of the filter, can follow the temperature fluctuations without encountering any damage, it is hardly possible that there can occur any tears or peeling off of material, especially in hat of the coating layer, so that also for this filter there takes place a surface filtration, which affords the advantage of a most extensively blockage-free filtering action. By means of this surface filtration there is also avoided increasing pressure losses, so that the filter can be operated at a uniform-remaining, low energy demand.

The various structures of the filter can also be modified in accordance with the demands on the filter such that, for example, the carrier material can be imparted a more or less large pore dimension. Analogous to this pore dimension, the pore dimension of the filler material can also be configured to be made more or less large; for instance, in the manner, that either a coarser fine-grained filler material is applied onto the carrier material or substrate, or the carrier material has more or less layers thereof adhered thereto. The filler material can hereby also be constituted; for example, from heat-resistant glass spheroids, ceramic granules or powder, fibers and the like, which after their application on the carrier material will film-like cover the latter.

A further advantageous embodiment of the invention distinguishes itself in that the filter is constructed as an inherently stable filter cartridge, and that this filter cartridge is clamped between the mounting supports under a spring load, and is hermetically sealed on these mountings with respect to the interior space of the filter housing. For the retention of every filter cartridge on these mountings, each filter cartridge, at its end facing towards the cleaning space or chamber, includes an injector-shaped tubular flange, and at its end facing towards the base of a discharge chute, includes a cylindrical or hollow bolt, of which both the tubular flange and cylindrical bolt each possess a ring-like or belt-shaped shoulder between which in shoulder and the filter candle, on the one hand, and the shoulder and the mountings, on the other hand, there is provided a seal, and that in addition to this calibering guide and mounting means for the filter cartridge, there is provided intermediate the shoulder of its cylindrical bolt and the mounting, a spring which presses the filter cartridge itself against all of its seals and/or against individual seals.

Another embodiment of the invention distinguishes itself in that the injector-shaped tubular flange, commencing from its shoulder, includes a skirt which immerses into the filter cartridge, and includes an upstanding collar directed oppositely from this shoulder, and wherein this collar extends through the opening of the mounting into the cleaning chamber.

There is also present an advantageous embodiment in that the cylindrical bolt, at least in its section intermediate its shoulder and the outwardly jutting extension, possesses annular grooves in that this section engages into bores of the mountings.

BRIEF DESCRIPTION OF THE DRAWINGS

Further advantageous features and modifications of the invention can now be readily ascertained from the following detailed description of exemplary embodiments thereof, taken in conjunction with the accompanying drawings; in which:

FIG. 1 illustrates a side view of a filter element which is constructed in the shape of a cylindrical tube;

FIG. 2 illustrates a sectional view through the filter element taken along line II—II in FIG. 1;

FIG. 3 illustrates a side view of a filter element which is constructed as a laminated packet;

FIG. 4 illustrates a sectional view through the filter element of FIG. 3 taken along line IV—IV;

FIG. 5 illustrates, on an enlarged scale, a plan view of a segment of the sectioned filter element of either FIG. 1 or 3 with a plurality of spheroids, for example, each of the same diameter, forming the covering layer thereof;

FIG. 6 illustrates a view which is similar to that of FIG. 5; however, with the spheroids; for example, possessing varying diameters;

FIG. 7 illustrates a sectional view through the filter element in the region of the covering layer thereof with a series of spheroids agglomerated balls thereon, and with powder particles which are introduced into the carrier material pursuant to encircled detail III in FIG. 4;

DETAILED DESCRIPTION

Figure 8:
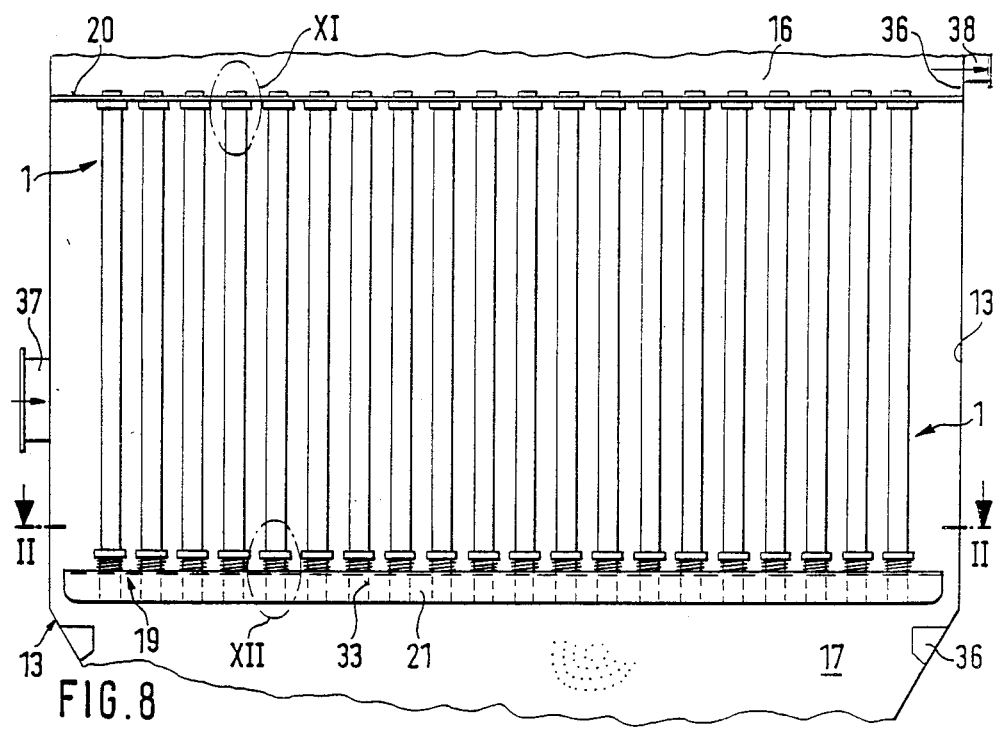
FIG. 8 illustrates a longitudinal sectional view through a filter housing including a filter element which is constituted from a plurality of filter cartridges.
Figure 9:
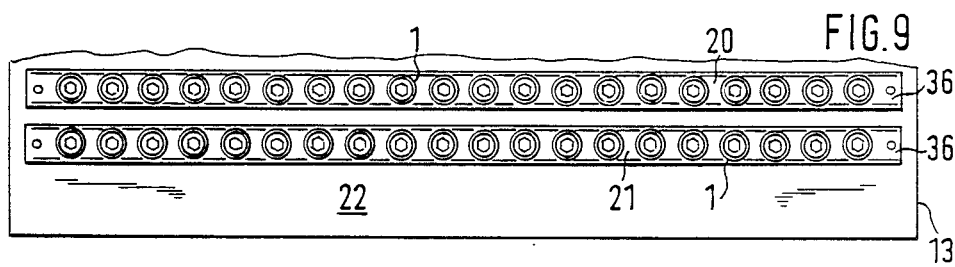
FIG. 9 illustrates a cross-sectional view through the filter housing with two parallel arranged filter elements taken along the line II—II in FIG. 8.

The filter element 1 pursuant to FIGS. 1 through 7, in this instance, is illustrated and described on the basis of two of the possible configurations. A simple such configuration can consist of a tubular filter element 1, as is illustrated in FIGS. 1 or 2. This filter element 1 is so configured as to form a cylindrical support member 2 which, at its one end, possesses a flange-shaped head 3 and at its other end possesses a bottom 4. Whereas the flange-shaped head 3, in itself possesses the aperture cross-section 5 of the filter element 1; in essence, that of the support member 2, which concurrently somewhat corresponds with the aperture cross-section 6 of the cylindrical support member 2, the bottom 4 of the support member is constructed as a closure thereof, and when required, there equipped with a foot portion 7 in order to be able to fix the support carrier member in a supporting framework 8 of a filter housing 13. The support member 2 itself, which is constituted from a heat-resistant material; for example, a ceramic, possesses a large-sized porous structure; in essence, possesses large pores 9, onto which there is applied a fine-porous structure in the shape of a covering layer 11 having fine pores 10. This covering layer 11 forms the filtering surface of the filter element 1 on which the particles which are to be separated out will separate out from the medium which is to be filtered.

The filter element 1 pursuant to the further possible configuration, as shown in FIG. 4, is based on a so-called laminated filter structure, for example, is illustrated in German Laid-Open Patent Appln. No. 34 13 213, and essentially distinguishes itself therefrom in that the support member 2, or respectively the carrier material, is produced from a heat-resistant material; for instance, of the above-described ceramic origin, and whose covering layer 11 is produced from a multiplicity of preferably spherical and/or pulverulent bodies 12 which are bonded with the material of the support member 2 and/or with each other, which are also of a heat-resistant material.

The different parts of the filter element 1, in effect, that of the support or carrier material 2 and its covering layer 11, evidence the different pore sizes, whereby the pores 9 of the support material must be dimensioned larger than the pores 10 of the covering layer, such as to enable the taking place of a filtration of the medium along the surface of the filter element 1.

Hereby, the carrier material 2 can be constituted of a ceramic in the form of an aluminum oxide ($Al_2O_3$), is zinc oxide ($ZnO_2$) or silicon oxide ($SiO_2$), whereby the manufacture thereof can be effected in the manner such that the respectively selected material is processed in an ordinary mode into a molded batch or mass; for instance, extruded into tubes, and thereafter baked or fired, from which there is produced the open- porous; meaning, large-porous support member; in essence, the support or carrier material 2. When in contrast therewith, the material of the carrier material 2 is filled into molds, which can be much more advantageous, then the flange-shaped head 3 and the bottom 4 which closes off the tubes can be filled in along therewith.

Applied onto the outer casing or mantle surface of this coarsely-porous carrier 2, is the finely-porous covering layer 11 either in the form of an emulsion through spraying or through brushing thereon, whereby this emulsion will conduct itself to nest into the openings or holes in the carrier material, and there cover the larger pores 9 by a multiplicity of smaller openings or, respectively, pores 10. The smaller pores 10 on the cover layer 11 are produced in that the material of the covering layer; for example, in the form of larger and smaller bodies 12, such as spheroids, will for example, partly bond point-like or linearly with each other, and unbonded surfaces will retain the openings in the shape of pores 10. These pores 10 or openings can extensively bee expediently dimensioned as to their size, so that the covering layer 11, or in essence, the coating forms a finely-porous layer, in the type of a film which is still permeable for a medium, which has a fine dimension for its pores 10.

A further possibility for the application of the covering layer 11 consists of in forming a muck from the finely-grained powder for the covering layer, such as is utilized in a similar consistency for purposes of enameling. The carrier material, i.e. the support member 2 can be immersed into this muck. This covering layer, together with the carrier material is then baked or fired, whereupon there is produced a finely and open-porous engobe, similar to a glazing. As in the case of the carrier material 2, through the vaporizing of the suspending fluid, there are also produced herein the necessary open small pores 10.

For the production of the filter element from these heat-resistant materials, one initially commences by employing for the carrier material 2 and this covering layer 11 constituents from the same base materials, whereby the adhesive agent which is employed in conjunction therewith will, during the heating of these materials (for example, during the baking or firing procedure), cause a melting together of these materials along their surface, in a kind of a sintering, as a result of which there is produced a homogeneous, permanent bonding. This is the instance, and is also confirmed through diverse experiments, for the carrier material 2 and covering material 11 consisting of aluminum oxide ($Al_2O_3$), as well as a ceramic adhesive of similar consistency.

Similar stable structures are produced, when chemically non-identical but similar materials interact with each other, and these are admixed in a liquid condition (a eutectic mixture, for example, from $Al_2O_3$ and $SiO_2$ or $ZnO_2$ and $SiO_2$) Moreover, it is also possible to provide a chemical bonding of the carrier material 2 and the covering layer 11, to the extent that it is stable at the temperatures encountered during use, and evidences approximately the same or better chemical resistance against structural changes, such as the carrier or covering material 2, 11. The partial bonding between the carrier and cover materials 2, 11 is effected through an adhesive agent 14, which can be formulated in accordance with the type of bonding during the firing or baking procedure, similar to an applied glazure, or as an adhesive bonding.

The thickness 15 of the coating; in essence, that of the covering layer 11, can be easily correlated with the currently set demands on the degree of cleanliness of the medium, in that more or less covering material is applied on the carrier material 2. Through this measure, there can also be correspondingly increased the filtering action of this covering layer 11.

The bonding of the covering layer 11; in essence, of its filler materials, with the carrier material 2 is preferably a homogeneous, intimate bonding which, as a rule, cannot be dissolved. This is important to the extent that since the covering layer 11 cannot be washed off the carrier material, which could easily be the case during the filtration of liquids.

The inventive filter element 1, pursuant to the exemplary embodiment of FIGS. 8 through 12, distinguishes itself only slightly from the filter element pursuant to FIGS. 1 through 7, and also serves for the separation of particles from gaseous or liquid media. For reasons of an improved understanding thereof, this filter element 1 is constructed in the shape of tubes or; in effect, filter cartridges, and essentially arranged in a filter housing 13 together with at least one further filter element in this housing. The housing 13 itself possesses a cleaning space or chamber 16 for the filtered medium and a discharge chute 17 for the particles, in addition to inlet and discharge connectors 37 and 38 for the medium. The filter element 1 which in accordance with the herein illustrated example, is constructed in the shape of the tubular filter cartridge, is preferably also produced from a ceramic material which; for instance, consists of a support member 2 possessing larger pores 9 and a surface coating, in essence, the covering layer 11 with fine pores 10. The mounting of this filter element 1, such as the respective filter cartridge, in the filtering space or chamber of the filter housing 13 can be undertaken either vertically or horizontally, whereby each filter cartridge at its respective end; in effect, the cartridge head 18 and the cartridge foot 19, possesses special attachment components through which it is fastened to the mounting supports 20, 21 in the filtering chamber. The attachment components at the cartridge head 18 are essentially formed by an ejector-shaped tubular flange 22 and at least one seal 23, 24, whereby the tubular flange in addition to an annular shoulder 25 includes a collar 26 projecting into the cleaning chamber 16 and a skirt 27 which immerses into the filter element 1. The annular shoulder 25, which generally forms the belt line of the tubular flange 22, possesses a larger diameter than the casing or mantle of the filter element 1. As a result thereof, the tubular flange 22 provides sufficiently large contact surfaces against which there support themselves the ends of the filter element, in effect, that of the filter cartridge, on the one hand, against the mounting 21 for this cartridge, and on the other end, against the mounting 20 at the end towards the cleaned gas. In order to hereby render the sealing extremely effective, it is recommended that seals 23, 24 be arranged at both ends of the annular shoulder 25; in effect, coaxially relative thereto, of which the one can possess a ring seal 32, and the other seal 24 in addition the ring surface, can also include a pouch-like enlargement. The pouch-like enlargement would, in such an instance, concentrically encompass the skirt 27 which immerses into the filter element 1, and there assume a sealing function as well as a radial, elastic support function. Understandably, it can also be contemplated that instead of the pouch-like sealing to provide a ring seal 32 at this location, and the filter cartridge besides the mounting 20 are mutually supported only by means of this seal.

The other end of the filter element 1 is primarily supported on the shoulder 28 of a cylindrical or hollow bolt 29, whereby this bolt, similar to the tubular flange 22, also possesses a collar 30 and an extension 31 which is directed oppositely thereof. By means of the collar 30 this cylindrical bolt 29 extends up to the shoulder 28 into the free open end of the filter element 1, whereby this collar can have no play or only a slight radial play between itself and the inner mantle surface of the filter element. The actual sealing of this end of the filter element at the cartridge foot 19, as well as at the cartridge head 18, is implemented through a ring seal 32 against which there sealingly contacts the end of the filter element. The extension 31 of the cylindrical bolt 29 itself engages into a bore 33 in the mounting 21, and engages so far therein such that the filter element remains guided within the bore not only against radial movements, but also against axial movements. In order to hermetically seal the respective filter element 1 with regard to the filtering space or chamber of the filter housing 13, a helical sprig 34 is positioned about the extension 31 intermediate the shoulder 28 on the cylindrical bolt 29 and the mounting 21, which spring supports itself at one end against the shoulder 28 and at the other end against the mounting 21. This helical spring 34 also presses the filter element 1; in effect, the filter cartridge, against the seals 23, 24 at the cartridge head 18, as well as the shoulder 28 against the ring seal 32, so that these seals come there into full contact.

Figures 10, 11, 12:
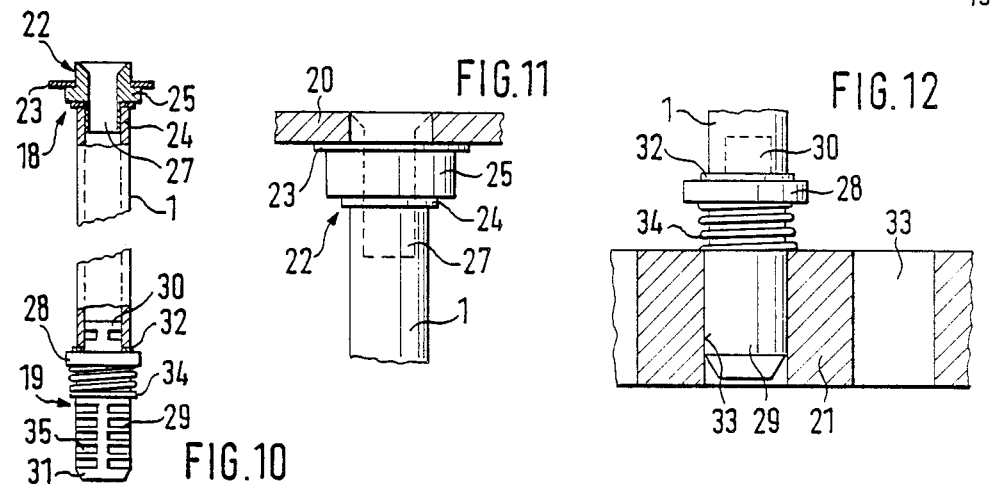
FIG. 10 illustrates on an enlarged scale, a sectional view of a filter element which is constructed as a filter cartridge and with the support means maintaining the filter cartridge therein.
FIG. 11 illustrates, on an enlarged scale, a longitudinal fragmentary sectional view from the encircled portion A in FIG. 8 through the head end of the filter cartridge with the tubular flange supporting the latter against the mounting.
FIG. 12 illustrates, on an enlarged scale a longitudinal fragmentary sectional view from the encircled portion B in FIG. 8 through the foot end of the filter cartridge with the cylindrical bolt supporting the cartridge against the mounting thereof.

The cylindrical bolt 29 itself can be of solid construction at its collar 30 and extension 31, or it can possess annular grooves 35 as is illustrated in FIG. 10 of the drawings. Moreover, instead of this cylindrical bolt 29 there can be employed an equivalent guiding component such as, for example, a fir-shaped spring, or a cross-arm. In the same manner, instead of the helical spring 34 there can be employed a plate spring or a plate spring-packet, which affords for the axial prestressing of the filter element 1.

The support mountings 30, 31 themselves which, under circumstances, can be formed as U-shaped struts, have their ends supported on brackets 36 of the filter housing 13, and can at those locations be supported either rigidly or resiliently.

The medium which is to be filtered, which flows through the inlet connectors 37 into the filtering space or chamber of the filter housing 13, streams about the individual filter elements 1 and passes therethrough into the cleaning chamber 16, while the particles therein which are transported along, deposit themselves on the casing or mantle surfaces of the filter elements. The medium which is conducted in this manner into the cleaning chamber 16 leaves the latter through the discharge connectors 38, in order to be conducted into the open or to be conveyed towards a further process. The particles which have accumulated on the filter cartridges are ejected through a known per se counterblowing against the filter cartridges, from the interior outwardly, and are conducted into the discharge chute 17 from which they are continually or intermittently carried away. The counterblowing installation can be a known jet cleaning device, whose nozzles blow their cleaning medium; for example, compressed air, into the openings of the injector-shaped tubular flange 22.

The assembly and disassembly of the filter elements 1, for example, the filter cartridges, is rendered particularly simple in this cartridge-shaped construction in that, subsequent to the insertion of the extension 31 of the cylindrical bolts 29 into the bore 33 of the mounting 21 and the pressing thereof against the force of the helical spring 34, the collar 30 of the tubular flange 22 at the cartridge head 18 is first pressed below the opening in the mounting 20 at this end, and after a slow release of the pressing force, this collar latches into the opening and fixes the filter cartridge therein. The dismounting of the filter cartridge or of the filter element 1 is effected in a reverse sequence, when it is intended to remove the latter from its mountings 20, 21.

The composition of the filler material; meaning, the covering layer 11, which is applied onto the support member 2, is composed in accordance with an advantageous material selection from the following constituents.

These constituents, which are dispersed as a mixture, are applied onto the support member 2; for example, by means of a brush, and this filler material together with the support member is exposed for approximately one hour to a temperature of about 500° C., as a result of which the filler material will bake itself into the material and the pores 9 of the support member 2.

The constituents of the filler material or the covering layer 11 can be combined essentially as follows:
1 part by volume of sodium silicate
14 parts by volume of water
4 parts by volume of kaolin
2 parts by volume of feldspar
2 parts by volume of starch (starch flour)
0.2 parts by volume of sodium diphosphate The filler material which is produced in this manner and applied onto the support member 2, deposits itself in the region of the mantle surface of the pores 9 of the support member 2, and fills these pores to such an extent so as to produce on the surface thereof a film-like coating. Thereby, the water is vaporized in response to the effect of the temperature, and the starch is similarly separated out from the mixture at this temperature through burning.

As already mentioned hereinabove, the filter elements 1 are produced from a ceramic, heat-resistant material. Naturally, this does not preclude that other filter elements 1, for example, from plastics, can be employed when the filter is adapted to operate with another temperature range. Thus, in the same manner, it is possible to employ other configurations of filter elements 1.

The filter element 1 is herein illustrated and elucidated for the filtration of hot gases. Understandably, this filter element 1 permits itself to be also employed for the filtration of hot liquids or gases or liquids which are not hot. This filter element 1 is also of special interest for aggressive media in the gaseous or liquid states, since it is hardly attacked by the aggressive substances.

The heat-resistant filter element 1 is herein represented and described through examples of the tubes and so-called laminated filters, as illustrated in FIGS. 1 through 4. Naturally, this filter element 1 can also possess other configurations. Herein, it is advantageous to select the configuration which offers the largest possible filtering surface. Such a configuration can also be a combined structure, somewhat an oval, triangular and other shape. The configuration will mostly depend upon the volumes which are to be filtered, the strength of the filter elements; that of the filter cartridge, and the medium which is to be filtered. The last-mentioned also determines the pore size which, for purposes of optimizing of the pressure losses, is correlated with the medium.

The function of the filter, relative to the jet cleaning, is represented and described with regard to the example for the separation of particles from gaseous media. The separation of particles from liquids is effected in a similar manner; however, in such a case, the cleaning must be carried out differently; in effect, through the counterflow of a clean liquid. To the extent, that the liquid permits a blowing in of air, there can also be utilized compressed air for the cleaning procedure.

What is claimed is:

1. In a filter for the separation of solids particles from hot, gaseous or liquid media, especially dust particles from hot flue gases in the temperature range of between 250° C. to 800° C., including a permeable, inherently stable, heat-resistant carrier material forming a support member and having larger-sized pores, said material containing constituents of non-corroding materials selected from the group consisting of glass, ceramic, metal compounds, said carrier material being producible through intimate partial bonding of the heat-resistant particles thereof and having a structure correlated with the intended utilization and specific capacity of the filter; the improvement comprising in that the larger-pored carrier material has at least the outer surface of the mantle surface thereof covered with a heat-resistant, ceramic fine-grained filler material for the formation of finer pores, said filler material being applied on the carrier material as a thin covering, said filler material being constituted of parts of a dispersed mixture, a portion of said mixture being introducible into the larger pores of the carrier material and another portion being volatilized during a firing process, said mixture being produced through an adhesive agent and suspension liquid and applied in this aggregate condition thereof onto the carrier material where it is partly bonded with itself and partly with the carrier material, the fine-grained constituents of the filler material and the adhesive agent each being constituted from material having a linear coefficient of thermal expansion which is generally equal to that of the carrier material, the material of the filler material being dimensioned in, the grain size thereof such that the pore size of said filter material is still below 10 μm, and said filler material is introduced into the larger pores about the mantle region of the carrier material and there at least partly fills the larger pores of the carrier material.

2. A filter as claimed in claim 1, wherein the filler material forms a homogenous, insoluble bond with the carrier material upon the application of heat.

3. A filter as claimed in claim 1, wherein the filler material applied onto the carrier material is baked into the carrier material at an elevated temperature.

4. A filter as claimed in claim 1, wherein the filler material is applied in at least one layer onto said carrier material.

5. A filter as claimed in claim 1, wherein the filler material is applied in two layers onto the carrier material, a first said layer being constituted from relatively coarse constituents which, in addition to causing a reduction in size of the larger pores of the carrier material also serves as a supporting matrix for a second said layer, said second layer being constituted from fine-grained constituents and possessing small pores facilitating a surface filtration.

6. A filter as claimed in claim 1, wherein the filler material is sprayed onto the carrier material, and said materials are jointly subjected to an adhesive or baking process.

7. A filter as claimed in claim 1, wherein the filler material is supplied as an emulsion in a bath, said carrier material being coated through immersion into the emulsion, and said materials being subsequently subjected to a baking process.

8. A filter as claimed in claim 1, wherein the carrier material and the filler material are constituted of ceramic, and said materials are permanently baked to each other through the effects of heat but remain openpored.

9. A filter as claimed in claim 1, wherein the carrier material and the filler material form a eutectic mixture, and upon cooling are permanently bonded to each other.

10. A filter as claimed in claim 1, wherein fine-grained filler material is suspended in powder form with a liquid, after addition of said adhesive agent is applied onto the carrier material, and said filler material is bonded by the adhesive agent with the carrier material.

11. A filter as claimed in claim 10, wherein the liquid for the suspending of the filler material is a material which is volatilized under the effects of heat, such as water, and after application onto the carrier material causes said filler material to remain in the carrier material with the formation therein of fine pores.

12. A filter as claimed in claim 1, wherein said filter is generally tubular; a filter housing having said filter arranged therein and including inlet and discharge connectors for the medium to be filtered and having been filtered, said housing including a discharge chute for particles separated from said medium, said medium being flowable through the mantle surface of said filter inwardly from the exterior thereof, and at intervals in a reverse direction of flow is blown or streamed through for the cleaning of the mantle surface by a cleaning flow, said filter housing including a cleaning chamber for the collecting and discharging of the filtered medium in the region of the discharge connector, and at least one arrangement for the cleaning of the filter element, between said arrangement and the bottom of the discharge chute there being located mountings for at least one filter element extending therebetween, the mounting facing towards the cleaning chamber having an opening between the filter element and the cleaning chamber, and the mounting facing towards the base having at least one support for the filter element, said filter element being constructed as an inherently stable filter cartridge, filter cartridge being spring-loaded and clamped between the mountings and sealed at said mountings relative to the interior space of the filter housing; for the retaining of each said filter cartridge on said mountings each said cartridge, at the end thereof facing towards the cleaning chamber, has an injector-shaped tubular flange and at the end facing towards the base of the discharge chute has a cylindrical bolt, said cylindrical bolt and said tubular flange each including a belt-shaped shoulder, seal means between the shoulder and the filter element and between the shoulder and the mounting, and wherein the calibering guide and mountings for the filter cartridge includes spring means between the shoulder and the cylindrical bolt and the mountings for imparting a spring-biasing action against said seal means.

13. A filter as claimed in claim 12, wherein said injector-shaped tubular flange extending from the annular shoulder thereof includes a skirt immersing into the filter element, and a collar oppositely directed from the shoulder, said collar extending through the opening of the mounting into the cleaning chamber.

14. A filter as claimed in claim 12, wherein said circular bolt includes annular grooves on least at a section between the annular shoulder and an outwardly projecting extension, said extension engaging into bores in the mountings.

15. A filter as claimed in claim 12, wherein the clamping of said filter elements between said mountings is pendulant.

16. A filter as claimed in claim 12, wherein each said mounting approximately from one inner wall to another inner wall of the filter housing, and a plurality of filter elements are spring-loaded and clamped between two respective mountings.

17. A filter as claimed in claim 16 wherein each said filter element is clamped between said mountings so as to be displaceable in at least an axial direction.

18. A filter as claimed in claim 1, wherein said filler material is composed of a disperged mixture of a plurality of constituents consisting of 1 part by volume of sodium silicate, 14 parts by volume of water, 4 parts by volume of kaolin, 2 parts by volume of feldspar, 2 parts by volume of starch (starch flour) and 0.2 part by volume of sodium diphosphate.

19. A filter as claimed in claim 18, wherein subsequent to the application of the filler material on the carrier material having the larger pores, said materials are jointly subjected to a baking process whereby during the baking process the volumetric parts of water are vaporized and the volumetric parts of starch are combusted.

* * * * *

UNITED STATES PATENT AND TRADEMARK OFFICE
CERTIFICATE OF CORRECTION

PATENT NO. : 4,979,969

DATED : December 25, 1990

INVENTOR(S) : Walter Herding

It is certified that error appears in the above-identified patent and that said Letters Patent is hereby corrected as shown below:

In the Abstract, line 14: "strucutre" should read as --structure--

Column 3, line 62: "hat" should read as --that--

Column 6, line 39: "bee" should read as --be--

Column 10, line 49, Claim 1: "said- filler" should read as --said filler--

Column 12, line 48, Claim 18: "disperged" should read as --dispersed--

Signed and Sealed this

Twenty-fifth Day of August, 1992

*Attest:*

DOUGLAS B. COMER

*Attesting Officer*   *Acting Commissioner of Patents and Trademarks*